(12) United States Patent
Fan et al.

(10) Patent No.: US 10,821,660 B2
(45) Date of Patent: Nov. 3, 2020

(54) HIGH-SPEED RECIPROCATING COLOR 3D PRINTER

(71) Applicant: Chunchao Fan, Zhaotong (CN)

(72) Inventors: Chunchao Fan, Zhaotong (CN); Yi Fan, Zhaotong (CN); Shihu Tu, Zhaotong (CN); Yuying Fan, Zhaotong (CN); Dian Fan, Zhaotong (CN)

(73) Assignee: Chunchao Fan, Zhaotong (CN)

( * ) Notice: Subject to any disclaimer, the term of this patent is extended or adjusted under 35 U.S.C. 154(b) by 237 days.

(21) Appl. No.: 15/779,396

(22) PCT Filed: Nov. 24, 2016

(86) PCT No.: PCT/CN2016/107118
§ 371 (c)(1),
(2) Date: May 25, 2018

(87) PCT Pub. No.: WO2017/088796
PCT Pub. Date: Jun. 1, 2017

(65) Prior Publication Data
US 2018/0339448 A1  Nov. 29, 2018

(30) Foreign Application Priority Data

Nov. 27, 2015 (CN) .......................... 2015 1 0847612

(51) Int. Cl.
*B29C 64/129* (2017.01)
*B33Y 30/00* (2015.01)
(Continued)

(52) U.S. Cl.
CPC .......... *B29C 64/129* (2017.08); *B29C 64/209* (2017.08); *B29C 64/245* (2017.08);
(Continued)

(58) Field of Classification Search
None
See application file for complete search history.

(56) References Cited

U.S. PATENT DOCUMENTS

2007/0065210 A1*  3/2007  Gipson ................. B41J 2/0057
                                                    400/124.1
2009/0244238 A1* 10/2009  Silverbrook ............ B29C 70/68
                                                    347/102
(Continued)

FOREIGN PATENT DOCUMENTS

CN        105082539    * 11/2015

*Primary Examiner* — Joseph S Del Sole
*Assistant Examiner* — Manley L Cummins, IV
(74) *Attorney, Agent, or Firm* — CBM Patent Consulting, LLC

(57) ABSTRACT

It discloses a high-speed reciprocating color 3D printer; said printer includes a nozzle assembly that is horizontally movable in one direction, preferably an X-axis direction, and a workbench that is vertically movable in the Z-axis direction. A plurality of spray pipes are mounted on the nozzle assembly, wherein, the spray pipes contains a variety of liquid printing materials, including white matrix material and a variety of color materials. In a movement process, each spray pipe works separately. The white matrix material is used to print out the image firstly, especially the darker area of the image, and then the color of the image is printed through the color material, and the resulting image partially protrudes outward.

10 Claims, 9 Drawing Sheets

(51) Int. Cl.
  *B29C 64/245*  (2017.01)
  *B29C 64/209*  (2017.01)
  *B29C 64/393*  (2017.01)
  *B29C 67/00*   (2017.01)
  B29C 64/112    (2017.01)
  B33Y 10/00     (2015.01)
  B33Y 50/02     (2015.01)

(52) U.S. Cl.
  CPC ........ *B29C 64/393* (2017.08); *B29C 67/0007* (2013.01); *B33Y 30/00* (2014.12); *B29C 64/112* (2017.08); *B29K 2995/0021* (2013.01); *B33Y 10/00* (2014.12); *B33Y 50/02* (2014.12)

(56) References Cited

U.S. PATENT DOCUMENTS

| | | | |
|---|---|---|---|
| 2010/0191360 A1* | 7/2010 | Napadensky | G06T 17/00 |
| | | | 700/98 |
| 2015/0079213 A1* | 3/2015 | Shi | B29C 64/209 |
| | | | 425/130 |
| 2015/0140147 A1* | 5/2015 | Konstantinos | B29C 64/106 |
| | | | 425/131.1 |
| 2015/0283751 A1* | 10/2015 | O'Neil | B29C 48/02 |
| | | | 264/308 |

* cited by examiner

HIGH-SPEED RECIPROCATING COLOR 3D PRINTER

TECHNICAL FIELD

The invention relates to a printer or a printing device, particularly relates to a high-speed color 3D printer with reciprocating movement of a nozzle, and belongs to the field of color 3D printers.

BACKGROUND ART

Physical printing is now a popular technology, and it refers to printing graphics on physical objects, such as printing graphics on the phone shell, so that the printed material is not limited to flat media such as paper. For example, CN 202213316U discloses a universal color physical digital printer, which can print characters, patterns or the like on the physical objects of soft and hard materials. However, the current printers print graphics that are simple color graphics, lack of three-dimensional appearance and not vivid enough. Although the graphics carved by the relief method have a three-dimensional appearance, the engraving cost is too high, the efficiency is low, and it is difficult to mass-produce.

The 3D printing production technology belongs to the forming additive manufacturing technology, which includes decomposing the three-dimensional solid figure designed by the computer into several plane layers by software, and printing through the 3D printer to produce the parts and components required by different materials. Due to its advantages such as flexibility, customization, and complex parts with near-net shape forming, it has broad prospects for development. Currently developed production methods include laser three-dimensional molding method, selective laser sintering method, selective electron beam sintering method, hot melt deposition molding method, etc., for example, CN 103895228A discloses a hot melt deposition molding color 3D printing apparatus.

Traditional 3D printing is generally powder 3D printing (3DP), which is a 3D printing method using droplet ejection and powder bonding technology. Under the control of the computer, according to the information of the current layered section, the nozzle selectively spray adhesive on a previously deposited layer of powder material to bind a portion of the powder and to form a thin layer of section. After one layer is formed, the workbench descends one layer thick, and carries on the powder coating of the next layer, then selects the area to spray the adhesive, and the formed thin layer also may adhere with the already formed part to be unitary simultaneously. This cycle is continued until the part is completely processed. In general, the formed parts also require some post-processing, such as drying, sintering, etc., to get the final parts. However, the existing powder 3D printer requires a long time for supplying powders and adhesive, has a long curing time, takes up a lot of space, has a complicated operation process, and is particularly inconvenient when cleaning unformed powders which easily cause powder contamination to the surrounding environment. For this purpose, CN 103935037A discloses an integrated powder color 3D printer.

How to combine physical printing with 3D printing technology to achieve the 3D printing effect, but also can effectively reduce costs and increases production efficiency, so as to achieve fast, efficient, flexible, and suitable for mass production, has always been the pursuit of the printing industry. Due to the above reasons, a fast printer capable of printing colorful 3D effect photos will have great use value and market prospects. For example, Chinese Patent No. 2015104586204 and Chinese Patent No. 2015104596206 provide a fast printer capable of printing colorful 3D effect photos. However, this device requires three-axis linkage during printing, and the nozzle needs to be reciprocated many times. Although the nozzle can move at high speed, the printing efficiency still has room for improvement.

CONTENTS OF THE INVENTION

In order to overcome the above problems, the inventor has made intensive studies to design a high-speed color 3D printer with reciprocating movement of a nozzle assembly, and a high-speed printing method using the same. The printer includes a nozzle assembly that is horizontally movable in one direction, preferably an X-axis or Y-axis direction, a workbench that is vertically movable in the Z-axis direction. A plurality of spray pipes and UV lamps are mounted on the nozzle assembly, wherein, the spray pipes contain a variety of liquid printing materials, including white matrix material and a variety of color materials. In a movement process, each spray pipe works separately. The white matrix material is used to print out the image first, especially the darker area of the image, and then the color of the image is printed through the color material, and the resulting image partially protrudes outward, which improves the three-dimensional effect and makes the image more vivid, thereby completing the present invention.

Specifically, it is an object of the present invention to provide a high-speed reciprocating color 3D printer; the printer includes an image processing module and an execution device;

Said image processing module includes a receiving module 010, a layering module 020, a calculation module 030 and an output module 040;

Said execution device includes a workbench 4 and a nozzle assembly 3, wherein, said workbench 4 is used to place and fix the object to be printed, preferably, said workbench 4 could move vertically in the Z-axis direction, said nozzle assembly 3 is used to spray material onto said object to be printed, preferably said nozzle assembly 3 could move in one horizontal direction, preferably in the X-axis direction.

According to the present invention, the length of said nozzle assembly 3 is greater than or equal to the width of the object to be printed on said workbench 4.

According to the present invention, said nozzle assembly 3 includes a plurality of spray pipes 31 arranged in parallel and a material curing device 36 arranged in parallel with the spray pipes, and a plurality of nozzles 32 are provided on said spray pipes 31; and/or Preferably, said spray pipes 31 contain materials and are independently connected with a feed constant pressure system 33.

According to the present invention, a plurality of nozzles 32 are disposed on said spray pipe 31, the nozzles 32 have minimum diameters of nanometers to picometers, and a voltage sensing switch 37 is disposed on the nozzle 32; and/or Preferably, the voltage sensing switch 37 on the nozzle 32 is connected to a control chip 34 by a wire 35, and said control chip 34 is connected to an image processing module. Preferably, said control chip 34 and said wire 35 are arranged in the spray pipe 31.

According to the present invention, said material curing device 36 includes one or two or more UV lamps, preferably two, which located on both sides of the plurality of spray pipes respectively.

According to the present invention, said execution device further includes a waste collection tank 1 and a liquid suction device 5, said waste collection tank 1 and said liquid suction device 5 are disposed on the path that the nozzle assembly 3 could move along in the X-axis direction;

Preferably, said liquid suction device 5 includes a suction connector 51 and a negative pressure machine 52, and further preferably, said suction connector 51 is in the shape of a hood with one end open, and the end surface of the opening is provided with a silicone gasket. Said liquid suction device 5 is further provided with a scraper, which is made of a soft material such as silica gel.

According to the present invention, said spray pipe 31 includes at least spray pipe for containing color (such as red, yellow, and blue) material and one or more spray pipes for containing white/transparent matrix material, preferably four spray pipes;

One or more spray pipes 31 are provided for containing black material; preferably, eight spray pipes 31 are provided, wherein, one for each of the spray pipes containing black, red, yellow, and blue materials, and 4 spray pipes filled with white/transparent matrix material.

According to the present invention, said execution device includes a plurality of nozzle assemblies 3, said plurality of nozzle assemblies 3 are arranged in parallel, and said plurality of nozzle assemblies 3 could be moved in the X-axis direction and sequentially pass over the workbench 4, and respectively spray the material on a workpiece to be printed;

Preferably, a plurality of spray pipes 31 in a plurality of nozzle assemblies 3 have at least three spray pipes contained red, yellow, and blue materials respectively, and further preferably, have at least one spray pipe contained black material.

According to the present invention, a ring band 7 is disposed above said workbench 4, and a plurality of nozzle assemblies 3 are mounted on the outer wall of the ring band 7, and the nozzle of the spray pipe on said nozzle assembly 3 faces the outside of the ring band 7. Said nozzle assemblies 3 can rotate around the workbench along the X-axis direction with the ring band 7, and sequentially pass over the workbench 4, and spray the material respectively on the workpiece to be printed;

Preferably, said ring band 7 is a ring belt;

Preferably, a plurality of spray pipes 31 in a plurality of nozzle assemblies 3 have at least three spray pipes contained red, yellow, and blue materials respectively, and further preferably, have at least one spray pipe contained black material.

The present invention also provides a method for rapid printing using the above-mentioned color 3D printer, including the following steps:

Step 1, obtain image information and process it through the image processing module;

Step 2, place the object or the workpiece 6 to be printed on the workbench 4, and adjust the distance between the object or the workpiece 6 to be printed and the nozzle;

Step 3, by cooperating with the workbench 4 and the nozzle assembly 3 of the execution device, the matrix material is first printed on the workpiece or the object to be printed, and this step is optionally performed once or repeated several times;

Step 4, by cooperating with the workbench 4 and the nozzle assembly 3 of the execution device, the color material is first printed on the workpiece or the object to be printed, and this step is optionally performed once or repeated several times;

Optionally repeat step 3 and step 4 mentioned above until printing is complete.

Wherein, preferably, in step 2, the object or the workpiece 6 to be printed is placed on the workbench 4, and an infrared height sensor is set to measure the height of the object to be printed. The distance between the object to be printed and the nozzle is 1 to 15 mm, preferably 2 to 10 mm, and more preferably 3 to 5 mm.

Preferably, the nozzle assembly 3 is moved above the liquid suction device 5 before the execution device performs the print job, and the spray pipe on the nozzle assembly is subjected to liquid suction treatment, and/or In the printing process, the nozzle assembly is moved above the waste collection tank 1 after a predetermined time or after the nozzle assembly reciprocates several times in the X-axis direction, and performed a scattering operation. Preferably, the nozzle assembly reciprocates in the X-axis direction 3-15 times, preferably 5-12 times, more preferably 7-10 times, and then performs a scattering operation.

Advantageous effects of the "reciprocating" high-speed color 3D printer provided by the present invention are as follows:

(1) The high-speed color 3D printer provided by the present invention has a plurality of material spray pipes, and can hold different color materials. In a single movement process, a plurality of spray pipes work separately to complete spraying of multiple colors, and the printing efficiency is high;

(2) The high-speed color 3D printer provided by the present invention has one or more spray pipes containing white or colorless matrix materials, and can quickly and efficiently form a coating layer with a predetermined thickness on the workpiece to be printed, so that the printed image has embossment to produce a distinct 3D effect;

(3) In the high-speed color 3D printer provided by the present invention, the control chip for controlling the nozzle is disposed in the spray pipe, which saves space, improves the integration of the nozzle assembly, makes the movement of the nozzle assembly more flexible, and facilitates the connection of said control chip and the image processing module, and decomposes the received control information, so that each nozzle can be precisely controlled;

(4) The material curing device in the high-speed color 3D printer provided by the present invention is equipped with a cooling system, which prevents the UV lamp from being overheated, thereby prolonging the service life of the UV lamp, and avoiding the phenomena that the materials in the nozzle consolidate and clog the nozzle;

(5) The high-speed color 3D printer provided by the present invention carries out "scattered spray" in a timely manner in the printing process, which avoids the situation that the remaining part of the material is solidified and blocks the nozzle due to the volatilization of the solvent components, and ensures the working life and working quality of the nozzle and the nozzle assembly;

(6) In the high-speed color 3D printer provided by the present invention, the lengths of the nozzle assembly and the spray pipe on the nozzle assembly are greater than or equal to the width of the object to be printed, so that the nozzle assembly does not have to move in two horizontal directions, but only in one horizontal axis direction (for example, the X-axis or Y-axis) to complete the entire nozzle operation of the object to be printed;

(7) The high-speed color 3D printer provided by the present invention has a plurality of nozzle assemblies, so that the system composed of the entire nozzle assemblies only needs to move once along one of the two horizontal axis (for example, the X-axis direction) to complete multiple spraying operations, thereby greatly improves the printing efficiency;

(8) In the rapid printing method provided by the present invention using a high-speed color 3D printer, printed images of different thicknesses can be obtained simply by setting the number of times of printing the matrix material layer and the color material layer, the operation is rapid, the image quality is high in accuracy, the three-dimensional effect is strong, and especially its speed is the fastest in the world;

(9) In the rapid printing method provided by the present invention using a high-speed color 3D printer, a 3D effect image can be formed on different workpieces or objects to be printed, and the time can be as short as several minutes, far faster than the current 3D printing speed.

DESCRIPTION OF THE REFERENCE SIGNS

Figure 1:
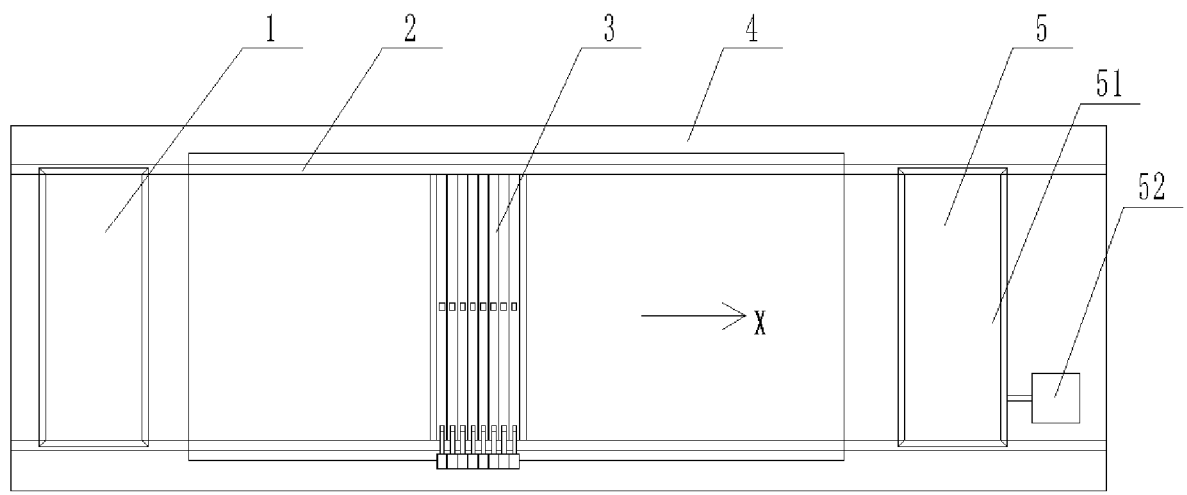
FIG. 1 shows a schematic view of the overall structure of the execution device according to a preferred embodiment of the present invention.

1—waste collection tank
2—X-axis drive device
3—nozzle assembly
31—spray pipe
32—nozzle
33—feed constant pressure system
34—control chip
35—wire
36—material curing device
361—UV lamp
362—cooling water sink
363—cooling water pipe
364—cooling water pump
365—cooling water tank
37—voltage sensing switch
4—workbench
5—liquid suction device
51—suction connector
511—silicone gasket
512—protrusion
513—screw
52—negative pressure machine
6—the object to be printed or the workpiece to be printed
7—ring band
8—frame
9—Z-axis drive device
010—receiving module
020—layering module
030—calculation module
040—output module

SPECIFIC EMBODIMENTS FOR CARRYING OUT THE INVENTION

Hereinafter, the present invention will be explained in more detail with reference to figures and examples. Through these explanations, the features and advantages of the present invention will become clearer.

The term "exemplary" as used herein is intended to be "serving as an example, an illustrative embodiment, or an embodiment". Any of the embodiments described herein as "exemplary" need not be construed as preferred or better than other embodiments. Although various aspects of the embodiments are shown in the figures, it is not necessary to draw a figure in proportion unless otherwise specified.

According to the "reciprocating" high-speed color 3D printer provided by the present invention, said printer includes an image processing module and an execution device, wherein, Said image processing module includes a receiving module 010, a layering module 020, a calculation module 030 and an output module 040, and is used to receive image information, layer the received image information, and calculate the color distribution of each layer, then calculate the working time of the nozzle when printing the layer, and finally transmit the calculated information to the execution device to control the operation of the execution device. Said execution device includes a workbench 4 and a nozzle assembly 3 disposed above the workbench, wherein said workbench is used to place and fix the workpiece 6 to be printed, that is, the object to be printed, and said nozzle assembly is used to spray material onto said workpiece to be printed (the object to be printed).

Further, the length of said nozzle assembly is substantially the same as the width of said workpiece 6 to be printed, or the length of said nozzle assembly is slightly longer than the width of said workpiece 6 to be printed, that is, after said workpiece 6 to be printed being placed and fixed on the workbench, the nozzle assembly only needs to move along the X-axis direction to spray the material to be sprayed on the upper surface of the workpiece 6 to be printed. By setting the nozzle assembly long enough, the feed movement of the nozzle assembly in the Y-axis direction can be eliminated, thereby greatly improving the printing efficiency.

Said 3D printing described in the present invention uses a method similar to 3D printing, in which a photocurable material is sprayed on the surface of an object to form a predetermined pattern, and a pattern having a three-dimensional effect is formed due to the certain thickness of the material. It can be called stereo picture printing.

Figure 3:
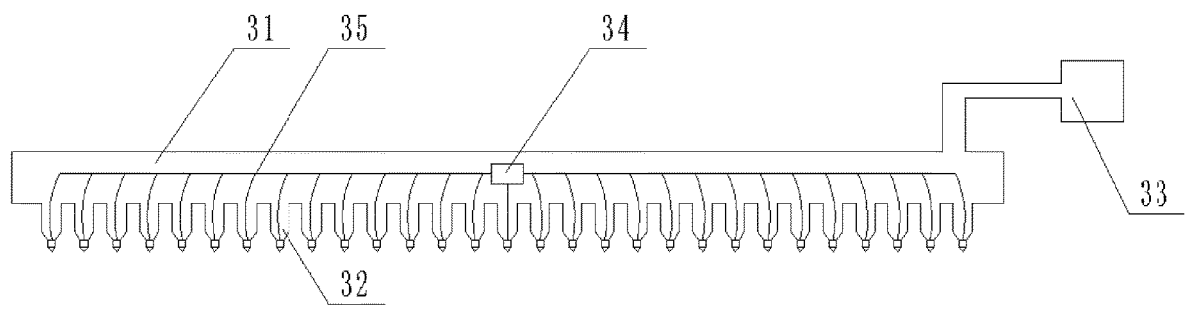
FIG. 3 shows a schematic structural view of the nozzle assembly on the execution device according to a preferred embodiment of the present invention.
Figure 4:
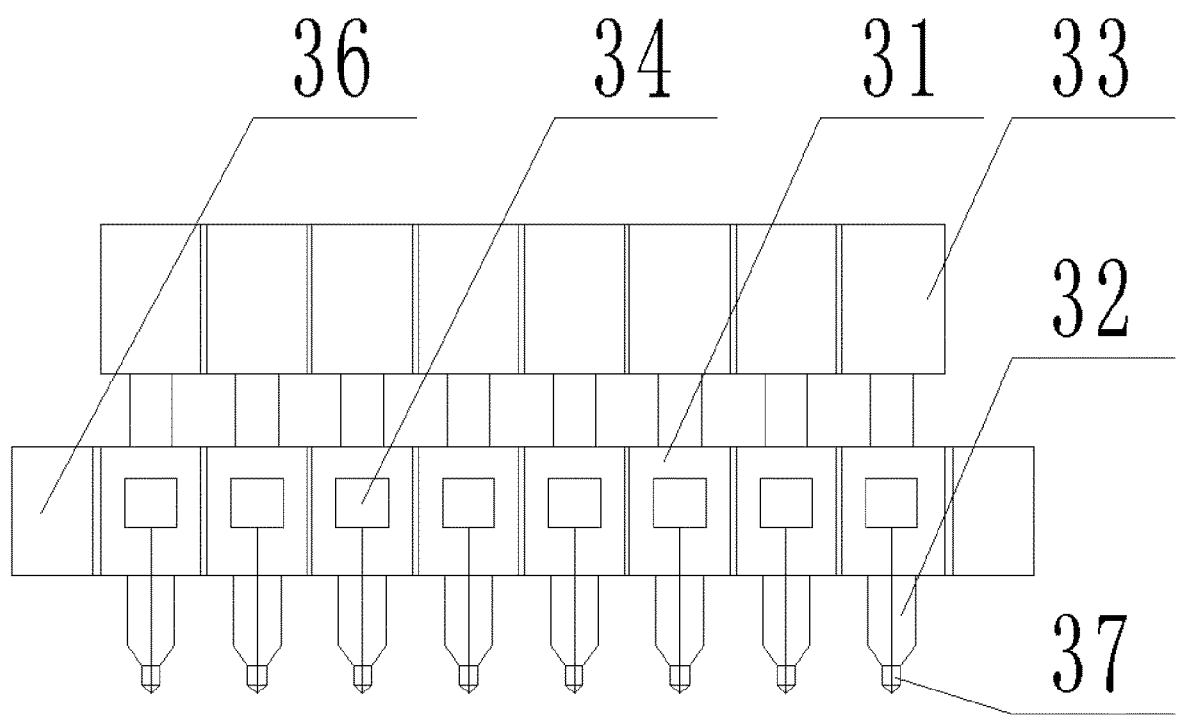
FIG. 4 shows a side view of the nozzle assembly on the execution device according to a preferred embodiment of the present invention.
Figure 5:
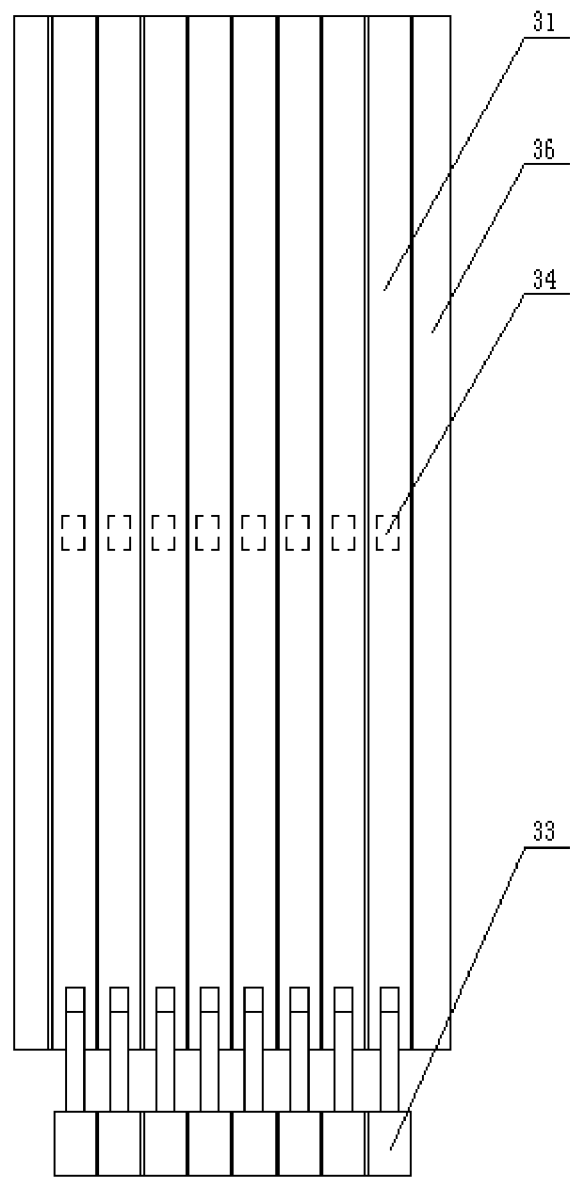
FIG. 5 shows a top view of the nozzle assembly on the execution device according to a preferred embodiment of the present invention.

In a preferred embodiment, said nozzle assembly 3 includes a plurality of spray pipes 31 arranged in parallel and a material curing device 36 arranged in parallel with the spray pipes, and a plurality of nozzles 32 are provided on said spray pipes 31, see FIG. 3, FIG. 4, and FIG. 5.

According to the present invention, the plurality of spray pipes 31 all contain materials, and the plurality of spray pipes 31 are all connected with a feed constant pressure system 33 independently, said feed constant pressure system 33 is used to ensure the spray pipes 31 with sufficient materials.

According to the present invention, a plurality of nozzles 32 are disposed on said spray pipe 31. Said nozzles 32 are very small and have a minimum diameter of nanometres or even picometres. Each nozzle 32 is provided with a voltage sensing switch 37, and the voltage sensing switch 37 controls whether or not the nozzle 32 sprays and the spray amount. Due to the close arrangement of a large number of nozzles on the spray pipe, the material to be sprayed can be made uniform and the droplets can be made small. When the droplets of the fine material of different colors are located in the same area, the color recognized by the naked eye is the combined color.

In a preferred embodiment, the voltage sensing switch 37 on each nozzle 32 is connected to a control chip 34 by a wire 35, said control chip is connected to an image processing module to decompose the received control information, so as to accurately control the operation of each nozzle, see FIG. 3, FIG. 4, and FIG. 5.

Preferably, said control chip 34 and said wire 35 are all arranged in the spray pipe to save space and reduce the outer structure of the spray pipe, and at the same time could avoid too many wires from passing through the wall of the spray pipe, thereby reducing the difficulty of sealing the spray pipe.

The nozzle used in the present invention may be a commercial or self-made nozzle that satisfies the above performance criteria. For example, the inkjet head disclosed in CN 1676331A and its manufacturing method can be used. For example, Japanese Seiko nozzles (manufactured by Seiko Instruments Corporation of Japan), Japanese KONICA (KONICA) piezoelectric actuators, Japanese EPSON (EPSON), Japanese KYOCERA (KYOCERA), Japanese RICOH (RICOH), Japanese TOSHIBA (TOSHIBA), British XAAR (XAAR) industrial inkjet nozzles, US SPECTRA (SPECTRA) print thermal foam nozzles, Piezoelectric nozzles, and US TRIDENT (TRIDENT) and so on, can also be used.

According to the present invention, a plurality of spray pipes 31 may be provided, and at least include a spray pipe for containing color material and a spray pipe for containing white matrix material, and preferably include spray pipes for containing red, yellow, and blue materials, and spray pipe for containing white matrix material, so the number of said spray pipes may be at least 4. The four spray pipes contain different color materials respectively, including red material, yellow material, blue material and white/transparent matrix material. Further preferably, said spray pipes can also include one or more spray pipes for containing black material. Further preferably, one or more spray pipes for containing white/transparent matrix material are provided, preferably more spray pipes are provided, so as to facilitate rapid and large-quantity printing of matrix material, which not only reduces costs, but also greatly improves printing efficiency.

Preferably, 8 spray pipes for containing different color materials respectively are provided, wherein, one for each of the spray pipes containing black material, red material, yellow material, and blue material, and 4 spray pipes filled with white/transparent matrix material.

According to the present invention, the material contained in said spray pipe is liquid. In order to quickly cure the material sprayed from the spray pipe through the nozzle, said nozzle assembly 3 is also provided with a material curing device 36 arranged in parallel with said plurality of spray pipes.

Preferably, the material can be rapidly cured under the irradiation of UV light. Therefore, the material curing device 36 in the present invention includes an UV lamp or UV lamp group such as LED UV lamp group, capable of emitting UV light outwardly. Said UV lamp may be one or two or more, and when the UV lamp is two or more, the UV lamps are disposed at intervals between the plurality of spray pipes. In the present invention, two UV lamps are preferably disposed on the two sides of the plurality of spray pipes, and the materials are sprayed in a predetermined region according to the shape of the image, and are immediately cured and formed under the irradiation of UV light.

Said material curing device 36 is equipped with a cooling system, such as a water cooling system, which can prevent the temperature of the UV lamp from being too high, thereby prolonging the service life of the UV lamp. For example, in the uncooled condition, the temperature after the material curing device starts can reach 50° C. or higher, and sometimes reach 80° C., or even as high as 100° C., which is not only unfavorable to the long-term use of the UV lamp, but also affects the material in the nozzle, making the solvent of the material evaporates and the resin solidifies, thus clogging the nozzle and affecting the normal printing. After cooling, the temperature could be reduced below 40° C., preferably below 30° C., for example up to room temperature, or between 15 to 25° C.

Figure 7:
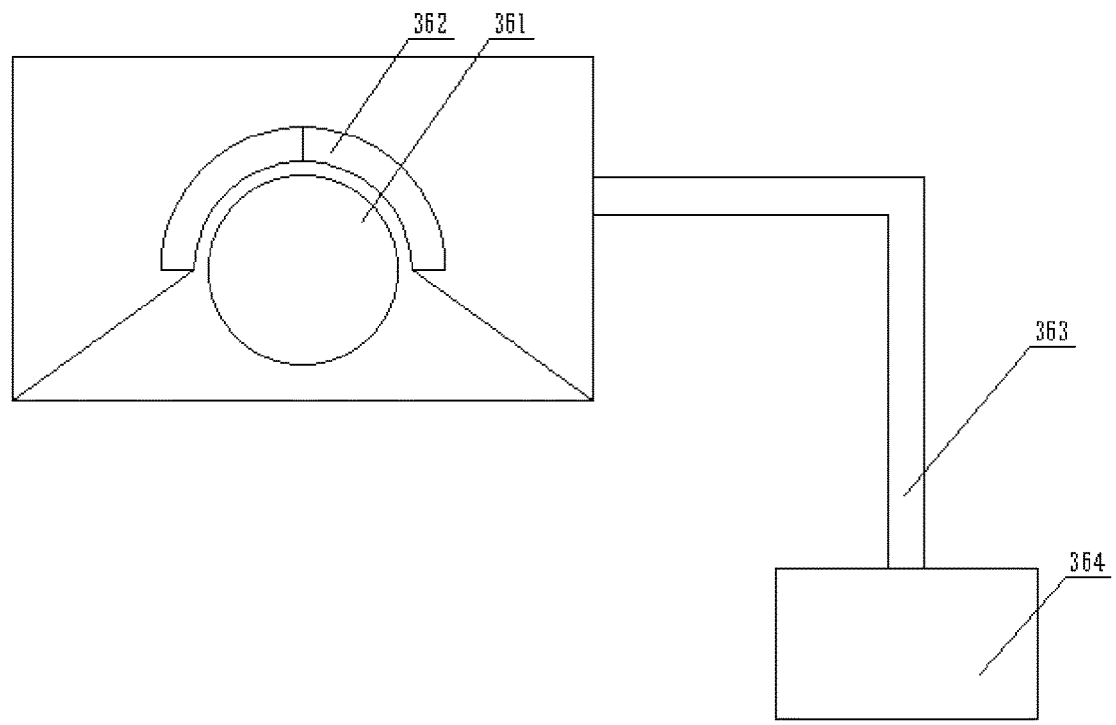
FIG. 7 shows a side view of the material curing device according to a preferred embodiment of the present invention.
Figure 8:
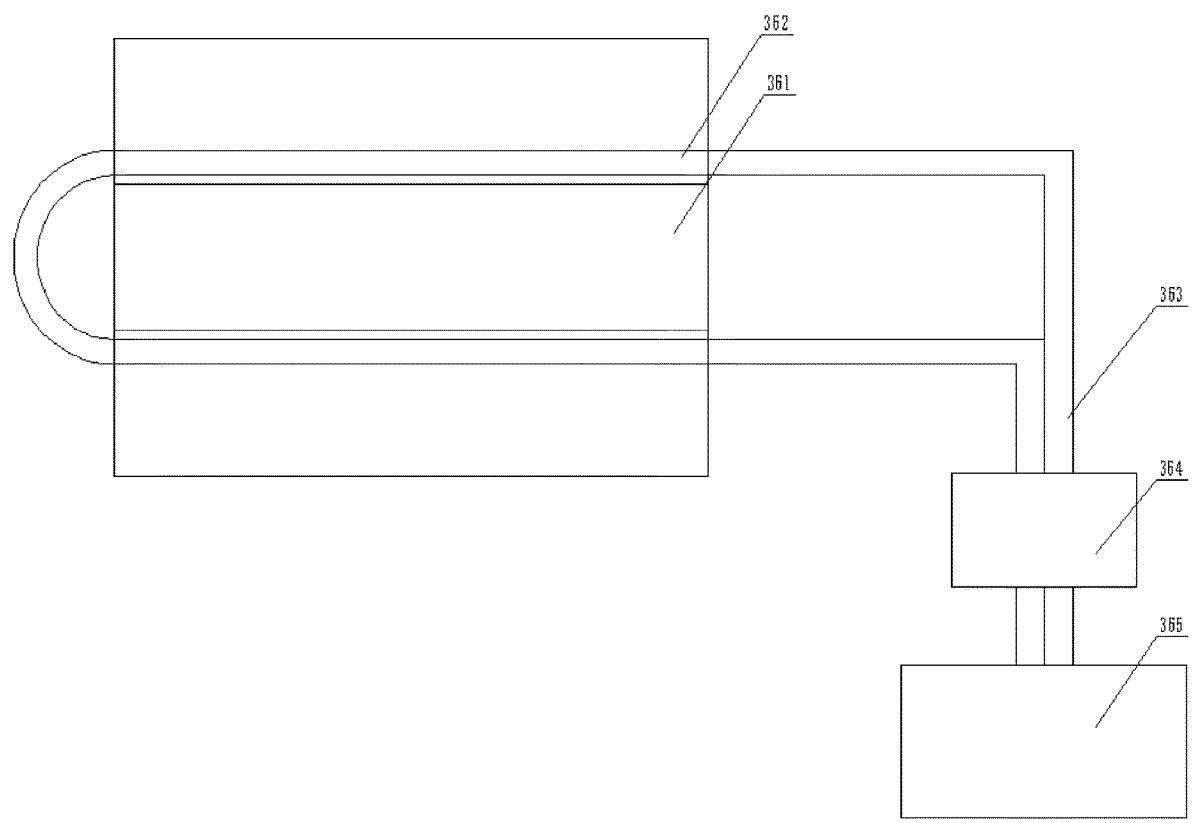
FIG. 8 shows a top view of the material curing device according to a preferred embodiment of the present invention.

In a preferred embodiment, said cooling system includes a cooling water sink 362 disposed on both sides of the UV lamp 361. There are two cooling water sinks 362, which are surrounded in a semi-enclosed manner near the UV lamp, and the two cooling water sinks 362 are connected by a pipe so that the cooling water inside can be circulated. The two cooling water sinks 362 are all connected with a cooling water pipe 363, and one end of the cooling water pipe 363 is connected to the cooling water sink 362, and the other end of the cooling water pipe 363 is connected to a cooling water tank 365 containing a large amount of cooling water. A cooling water pump 364 is provided on the cooling water pipe 363, and provides power for the circulation of the cooling water in the cooling system; see FIG. 7 and FIG. 8.

The material used in the high-speed color 3D printer of the present invention may be a composition comprising a photocurable resin and a pigment. Said pigment comprises a white or transparent matrix material and a color material. Said photocurable resin is a resin that undergoes a photocuring reaction under UV light irradiation. For liquid use, the resin is dissolved and/or dispersed in a solvent.

According to the present invention, the photocurable resin may be a conventional photocurable photosensitive resin, such as one or a mixture of the following oligomers: pure acrylic resin, epoxy resin, unsaturated polyester, modified acrylate (epoxy acrylate, polyurethane acrylate, polyester acrylate, polyether acrylate), and silicone oligomers.

According to the present invention, a conventional inorganic pigment may be mixed with a photocurable photosensitive resin to form a matrix material, preferably dissolved or suspended the inorganic pigment and the photocurable photosensitive resin in a solvent. The inorganic pigment may be, for example, a titanium white pigment. The solvent may be, for example, a common organic solvent, such as an alcohol solvent, a ketone solvent, an ester solvent, preferably an alcohol solvent, and more preferably ethanol or an aqueous solution thereof.

According to the present invention, a conventional color pigment may be mixed with a photocurable photosensitive resin to form a color material, preferably dissolved or suspended the color pigment and the photocurable photosensitive resin in a solvent. The color pigment may be, for example, various inorganic or organic color pigments, preferably organic color pigments such as quinones or phthalocyanine color pigments. The solvent may be, for example, a common organic solvent, such as an alcohol solvent, a ketone solvent, an ester solvent, preferably an alcohol solvent, and more preferably ethanol or an aqueous solution thereof.

The printing material used in the present invention may also include various additives such as various conventional cationic initiators, free radical initiators, accelerators, leveling agents, reactive diluents, defoamers, and the like.

In a preferred embodiment, said workbench 4 may be movable or fixed. If the workbench is fixed, the relative movement between the workbench and the nozzle assembly 3 is only the movement of the nozzle assembly in the X-axis direction. The workbench can also be movable, and the workbench can control the position of the object to be printed thereon moves along the X-axis or the Y-axis. The purpose of the movement is to quickly change the object to be printed, especially when the nozzle assembly is continuously working, and the movement along the X-axis or the Y-axis of the workbench ensures that there is at least one object to be printed below the nozzle of the nozzle assembly to avoid empty running of the nozzle assembly, and then fully improve the printing efficiency.

Figure 2:
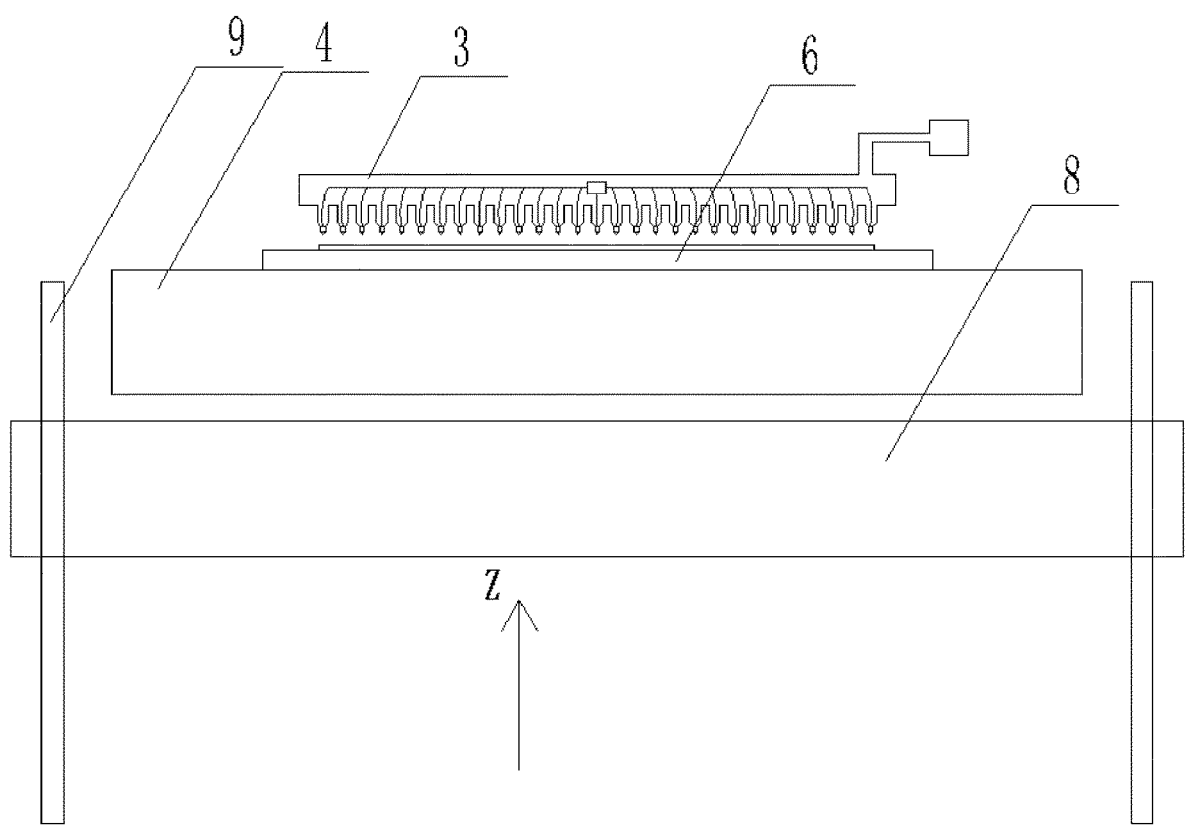
FIG. 2 shows a side view of the overall structure of the execution device according to a preferred embodiment of the present invention.

In the present invention, preferably, both said X-axis direction and said Y-axis direction are located in the same horizontal plane. Further, said workbench can also move in the vertical direction while moving in the Y-axis direction, as shown in FIG. 2, wherein the Z-axis direction shows the vertical direction. In the present invention, since the nozzle assembly may complete the print job by one movement, the vertical direction may be eliminated.

In a preferred embodiment, as shown in FIG. 1 and FIG. 2, said execution device further includes a waste collection tank 1 and a liquid suction device 5, said waste collection tank 1 and said liquid suction device 5 are disposed on the path that the nozzle assembly 3 could move along in the X-axis direction.

According to the present invention, when said nozzle assembly is moved in the X-axis direction above the waste collection tank 1 and stopped, a "scattered spray" operation may be performed. The waste collection tank is used for collecting and containing the waste ink ejected from the "scattered spray" operation. The scattered spray described in the present invention refers to a spraying operation in which all the nozzles on the spray pipe eject the material to the maximum at the same time. Since the material is volatile, when the material especially the solvent component in the material is volatilized, the remaining portion is easily solidified, thereby clogging the nozzle. The purpose of the scattered spray is to spray a large amount of material through the nozzle, so that the material solidified or partially solidified and adhered to the nozzle is taken away during the flow of the material to prevent the solidified material from clogging the nozzle, ensuring the working life and working quality of the nozzle and the nozzle assembly 3.

The liquid suction device 5 includes a suction connector 51 and a negative pressure machine 52, and said suction connector is matched with the nozzle assembly. When said nozzle assembly moves in the X-axis direction above said liquid suction device and stops, said suction connector and the nozzle assembly can move in the vertical direction, that is, the nozzle assembly moves downwards or the suction connector moves upwards, so that the suction connector and the nozzle assembly are sealed and connected, and the negative pressure machine provides power to suck out the material and air in the spray pipe and the nozzle. The liquid suction device works mainly when it is started for the first time after being parked for a long time, or works when it is found that the print quality is not ideal, and the negative pressure machine provide external force to suck out the remaining material and air in the nozzle, so that the nozzle is full of material without no fault.

Figure 9:
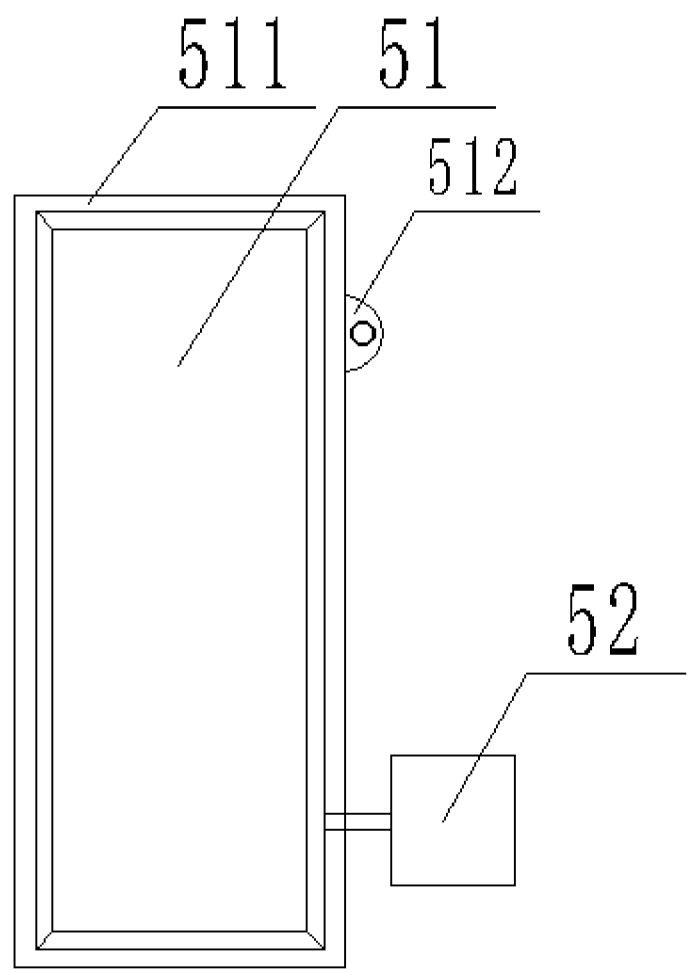
FIG. 9 shows a top view of the liquid suction device according to a preferred embodiment of the present invention.
Figure 10:
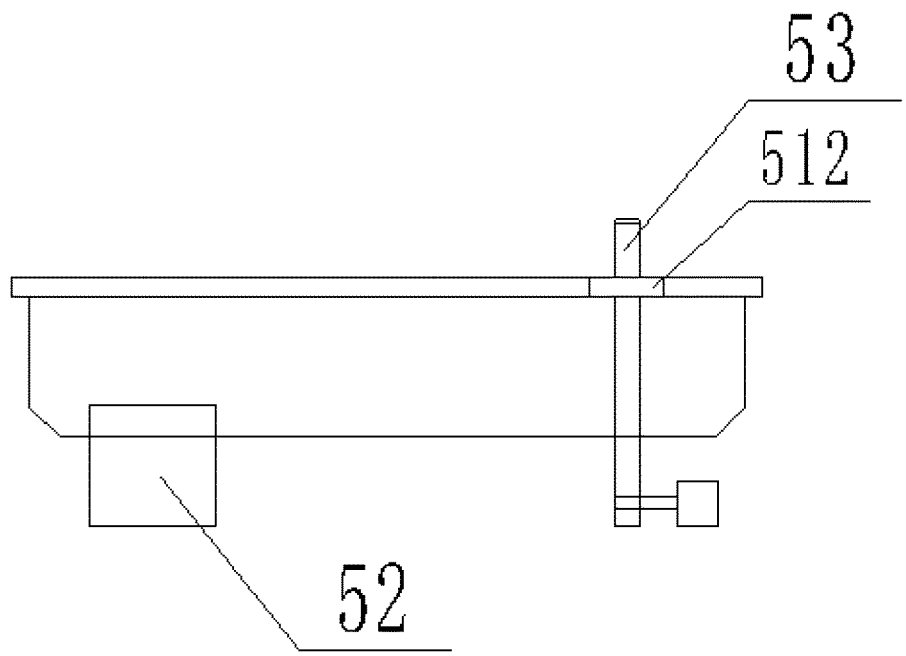
FIG. 10 shows a side view of the liquid suction device according to a preferred embodiment of the present invention.

In a preferred embodiment, said suction connector 51 is in the shape of a hood with one end open, and the end surface of the opening is provided with a silicone gasket 511. The close contact between the silicone gasket and the nozzle assembly causes the nozzle to be sealed in a sealed chamber formed by the nozzle assembly, as shown in FIG. 9 and FIG. 10.

A protrusion 512 protruding outward is provided near the open end of said suction connector 51, and a threaded hole is opened in said protrusion 512. The suction connector 51 is further provided with a screw 513 passing through said threaded hole for driving the suction connector 51 to move up and down in the vertical direction, and the screw 513 is driven to rotate by a driving mechanism such as a motor to drive the suction connector to move upwards, so that the silicone gasket 511 is brought into close contact with the nozzle assembly to form a sealed chamber.

The liquid suction device 5 is further provided with a scraper, which is made of a soft material such as silica gel. After said negative pressure machine completes the suction operation, said scraper moves within the sealed chamber to scrape off the exposed adhesive material outside the nozzle to ensure that the nozzle is neat and the nozzle is in a standby state.

In a preferred embodiment, as shown in FIG. 1 and FIG. 2, said execution device further includes an X-axis drive device 2 for controlling the movement of the nozzle assembly 3 in the X-axis direction, and a Z-axis drive device 9 on the frame 8 for controlling the movement of the frame 8 in the Z-axis direction. Said X-axis drive device 2 and said Z-axis drive device 9 described in the present invention could all use drive devices commonly used in the art, and the drive principles of each drive device can be the same or different, such as a belt transmission device, a rack and pinion transmission device, a ball screw and so on.

Figure 11:
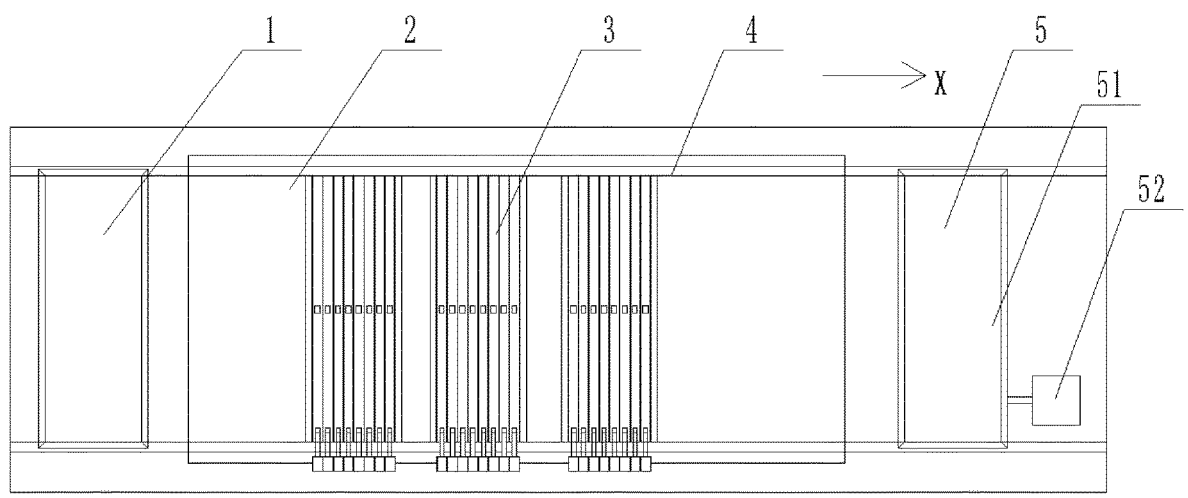
FIG. 11 shows a schematic view of the overall structure of the execution device including a plurality of nozzle assemblies according to a preferred embodiment of the present invention.

In a preferred embodiment, as shown in FIG. 11, said execution device includes a plurality of nozzle assemblies 3, said plurality of nozzle assemblies 3 are arranged in parallel, and said plurality of nozzle assemblies 3 could be moved in the X-axis direction and sequentially pass over the workbench 4, and spray the material on said workpiece to be printed respectively. Further, multiple nozzle assemblies may be integral or separate and detachable. Each nozzle assembly receives the control instruction passed by the image processing module, and when the nozzle assembly moves above the workbench, it sprays the material according to the instruction, so that the object to be printed on the workbench is sprayed with sufficient material in a very short time, which makes the print job completed quickly.

Further, the execution device includes a plurality of nozzle assemblies 3, the plurality of spray pipes 31 in the plurality of nozzle assemblies 3 have at least three spray pipes contained red, yellow, and blue materials respectively, and further preferably, at least one spray pipe contains black material. That is, the color of the material in the spray pipes of multiple nozzle assemblies at this time can be determined according to the positions of the nozzle assemblies and the spray pipes, and there can be multiple combinations. In the case where the requirements for use are satisfied, the color of the spray pipes can be determined according to actual conditions, and the present invention is not particularly limited.

Figure 12:
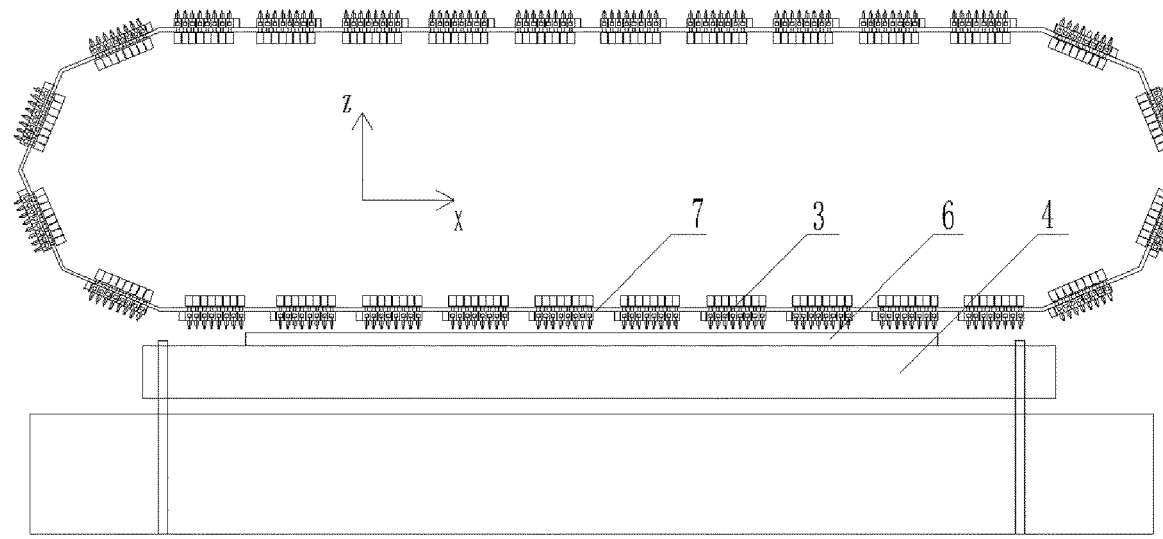
FIG. 12 shows a schematic view of the overall structure of the execution device including a ring band according to a preferred embodiment of the present invention.

In a further preferred embodiment, as shown in FIG. 12, said execution device further includes a ring band 7 disposed above said workbench 4, and said ring band is preferably a ring belt. The plurality of nozzle assemblies 3 are mounted on the outer wall of the ring band 7, and the nozzle of the spray pipe on said nozzle assembly 3 faces the outside of the ring band 7. Said nozzle assemblies 3 can rotate around the workbench 4 along the X-axis direction with the ring band, and sequentially pass over the workbench 4, and spray the material on said workpiece to be printed respectively. When the nozzle assemblies are located at a position other than the workbench, they are controlled by the control chip and no material is sprayed. This arrangement can avoid the reciprocating motion of the nozzle assembly and further improve the printing efficiency. In a preferred embodiment, the printer is further provided with a rotating shaft for controlling the rotation of the ring band and a power device, and a plurality of rotating shafts is provided.

Similarly, when said execution device includes a ring band 7 with a plurality of nozzle assemblies 3 mounted on the ring band 7, the plurality of spray pipes 31 in the plurality of nozzle assemblies 3 have at least three spray pipes contained red, yellow, and blue materials respectively, and further preferably, at least one spray pipe contains black material. That is, the color of the material in the spray pipes of multiple nozzle assemblies at this time can be determined according to the positions of the nozzle assemblies and the spray pipes, and there can be multiple combinations.

In a preferred embodiment, when said execution device includes a plurality of nozzle assemblies 3, each nozzle assembly is provided with 8 spray pipes, and 4 of them are filled with white/transparent matrix material, and the other 4 spray pipes are filled with black, red, yellow and blue material respectively to accommodate a variety of printing requirements.

According to the present invention, said image processing module includes a receiving module 010, a layering module 020, a calculation module 030 and an output module 040.

Figure 6:
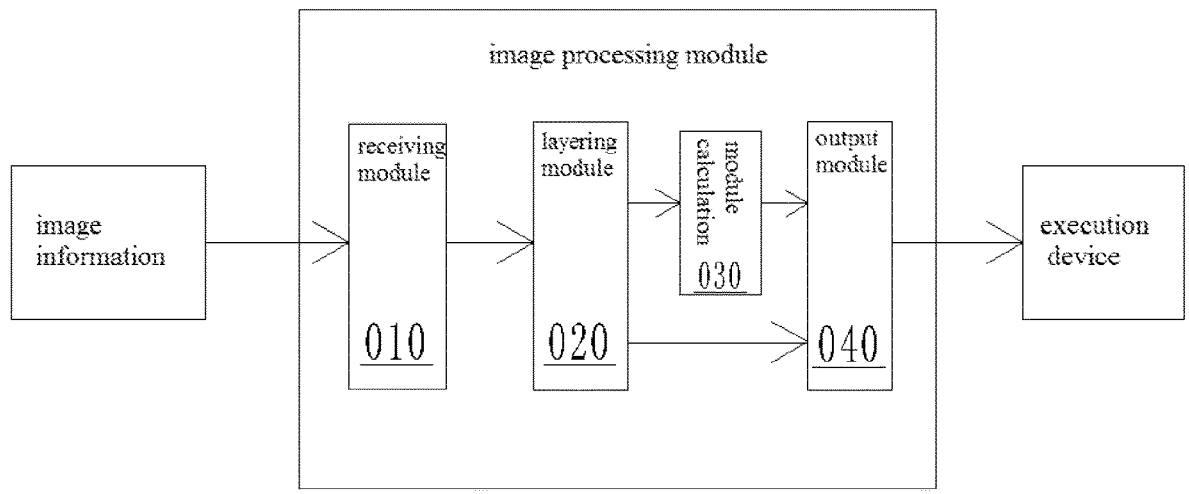
FIG. 6 shows the image processing module and a schematic diagram of the working process according to a preferred embodiment of the present invention.

As shown in FIG. 6, said receiving module 010 is configured to receive the image information to be printed, and may transmit the image information to be printed to the receiving module through a data line, Bluetooth, or other transmission method.

Said layering module 020 is used to divide the image into multiple layers according to the color depth of the image, and generally includes at least one matrix layer and one color layer, and therefore the image needs to be separated into two layers at least. On this basis, it is also possible to separate the image into more layers, that is, one or more matrix layers and one or more color layers. The presence of the matrix layer results in a three-dimensional effect of the final image. The matrix layer can be printed one or more times, that is, printing more matrix material at a time to form a thicker matrix, or printing the matrix material multiple times, eventually forming a thick matrix, and finally the color layer is printed on the matrix layer, alternatively, the matrix layer and the color layer can be alternately printed. In principle, any number of layers can be set. The specific number of layers is freely selected according to the desired degree of clarity of the printed image and the strength of the three-dimensional effect of the printed image. In other words, the more layers are separated, the stronger the 3D effect, and the higher the print quality, and the correspondingly longer print time. Of course, if there are enough spray pipes, each spray pipe can be sprayed once to complete the corresponding operation requirements.

Among the multiple picture layers separated by the layering module, there is at least one picture layer contains the color information of the image to be printed, the information of the picture layer needs to be transmitted to the calculation module, and the color matching ratio required for printing the picture layer and the corresponding nozzle working condition are calculated through the calculation module. Among the multiple picture layers, there is also a picture layer that describes the deep color area information of the image, and there may be a plurality of picture layers, and the sizes of the regions described on the different picture layers may also be different.

The printing order is to print the picture layer that contains the deep color area information first, and could print only with the white/transparent material. The picture layers that all record the deep color area information will preferentially print a picture layer with a large area. After the picture layers containing the deep color area information are all printed, the workpiece to be printed already has a certain thickness, and then the picture layer with the color information of the image to be printed is printed on the basis. The above printing process is mainly applicable to the case when the number of layers is small. If there are many layers, the picture layer with the color information of the image to be printed may be properly inserted in the process of printing the picture layer that contains the deep color area information, so that the side of the raised portion of the product image finally has a uniform color and the product image has a rich three-dimensional appearance.

Said calculation module 030 is configured to calculate the color matching ratio required for printing the picture layer and the corresponding nozzle working conditions according to the color information of the image to be printed, that is, by analyzing the color condition at any point, calculating the ratio of raw materials needed for printing the color. Said raw materials include red material, blue material, and yellow material. For ease of control, said calculation module also records the number of each spray pipe and the color of the material in each spray pipe. The above information can be manually input and changed to adapt to the modification and adjustment of the equipment.

Said output module is configured to uniformly send the information passed by the layering module and the calculation module to the execution device, and control the execution device, which includes controlling the movement of the nozzle assembly 3 of the execution device in the X-axis direction, and optionally, controlling the movement of the workbench in the Z-axis direction, and also includes controlling the opening and closing of the UV lamp 36, the turning on of the voltage sensing switch 37 at a predetermined time and material spraying of the nozzle.

The present invention also provides a method for rapid printing using the above-mentioned color 3D printer, including the following steps:

Step 1, obtain image information and process it through the image processing module;

Step 2, place the object to be printed or the workpiece 6 on the workbench 4, and adjust the distance between the object to be printed and the nozzle;

Step 3, by cooperating with the workbench 4 and nozzle assembly 3 of the execution device, the matrix material is first printed on the workpiece or the object to be printed, and this step is optionally performed once or repeated several times (this step can be performed once when there are multiple nozzle assemblies);

Step 4, by cooperating with the workbench 4 and nozzle assembly 3 of the execution device, the color material is first printed on the workpiece or the object to be printed, and this step is optionally performed once or repeated several times (this step can be performed once when there are multiple nozzle assemblies);

Optionally repeat step 3 and step 4 mentioned above until printing is complete.

In the above step 1, the processing of the image processing module mainly includes the following substeps 1'-3':

Step 1': input the image to be printed to the receiving module in the image processing module;

Step 2': Enter the number of layers into the layering module;

Step 3': Start the execution device after the calculation of the calculation module is completed and transmission of the obtained data to the execution device through the output module.

In the above step 2, the object to be printed or the workpiece 6 is placed on the workbench 4, and the distance between the object to be printed and the nozzle is in principle as close as possible, but the premise is that the nozzle cannot be scraped. For this purpose, an infrared height sensor is provided to measure the height of the object to be printed, and the distance between the object to be printed and the nozzle is generally controlled to be between 0 and 20 mm, preferably 1 to 15 mm, more preferably 2 to 10 mm, and further more preferably 3 to 5 mm.

The above step 3 is to print the matrix material on the workpiece or the object to be printed, which can be printed once or several times, depending on the desired thickness of the matrix material and the printing efficiency.

The above step 4 is to print the color material on the workpiece or the object to be printed, which may be the last printing, that is, after the color material is printed, the printing is finished; however, if it is required that the printing pattern is three-dimensional or the 3D effect is obvious or the thickness of the matrix material is thick, the color material can also be printed multiple times, thereby avoiding exposure of the matrix material from the side of the pattern.

The above step 3 and step 4 need to be completed by the cooperation of the workbench 4 and the nozzle assembly 3 on the execution device.

According to the present invention, before starting the execution device, it is necessary to check whether the material on the execution device is sufficient, whether the state of the device is normal, and before starting, the workpiece to be printed is mounted and fixed on the workbench.

According to the present invention, before the execution device executes a print job, it is necessary to move the nozzle assembly to above the liquid suction device 5, and perform a liquid suction treatment on the spray pipe of the nozzle assembly.

According to the present invention, during the printing process, the nozzle assembly needs to be moved over the waste collection tank 1 every predetermined time or after the nozzle assembly is reciprocated several times in the X-axis direction, and a scattering operation is performed. In the present invention, preferably, the nozzle assembly is reciprocally moved in the X-axis direction 3-15 times, preferably 5-12 times, more preferably 7-10 times, to perform a scattered spraying operation.

Further, during the printing process of the execution device, first, a nozzle spray material on a spray pipe containing a white/transparent matrix material, the spray pipe prints a white or transparent image by spraying the material, and the image has a three-dimensional appearance, and a part of the image protrudes outward. Finally, the material is sprayed from nozzles on the spray pipes containing the red, yellow, blue, and black materials to complete the print job for the workpiece.

Preferably, the area to be printed of the workpiece is white to enhance the visual effect. If the area to be printed is non-white, it may be considered to first spray the area white. In addition, the white/transparent material described in the present invention is preferably a white material.

The product printed by the printer and the printing method provided by the present invention is a colored image with a stereoscopic effect, and the image is basically the same as the image sent to the image processing module, and the difference is that the image is not a flat pattern, and it has a certain height in the darker area, that is, the area protrudes upwards, which enhances the three-dimensional effect and makes the image more vivid.

Example 1

The workpiece to be printed is the shell of the phone, and it is planned to print half-length portrait of the character on the back.

For this purpose, first, the digital information of the portrait photo to be printed is transmitted to the receiving module of the image processing module via a data line or Bluetooth.

According to the stereoscopic or 3D effect to be obtained, for example, the facial contours, hair, and blouses of a portrait photo need to have raised portions, set different shades of color, and then separate the image into multiple layers according to the color depth of the image, including at least one or more matrix layers and one or more color layers.

The information of the picture layer corresponding to the matrix layer is transmitted to the calculation module, and the color matching ratio required for printing the picture layer and the corresponding nozzle working condition are calculated by the calculation module.

Put the phone shell on the workbench 4 and adjust the distance between the object to be printed and the nozzle 3 mm.

The executing device receives the data calculated by the calculating module through the output module, then starts, and at the same time, turns on the UV lamp for curing the material. The nozzle assembly 3 moves in the X-axis direction to print a white matrix material (which is titanium dioxide suspended in an acrylic photocurable resin and an ethanol solution) on the phone shell. The nozzle assembly 3 prints the white matrix material while moving in the X-axis direction, depending on the desired raised thickness, this step can be performed one or more times to obtain a white matrix layer with a thickness of about 1.1 to 1.5 mm or more.

The height can then be adjusted, that is, the workbench moves downwards in the vertical direction of the Z-axis so that the phone shell is still in a suitable printable position.

Then the information of the picture layer corresponding to the color layer is passed to the calculation module, and the color matching ratio required for printing the picture layer and the corresponding nozzle working station are calculated.

The nozzle assembly 3 moves in the X-axis direction to print color materials on the matrix layer of the phone shell (which are the respective color pigments dissolved in acrylic photocurable resin and ethanol solution). The nozzle assembly 3 prints the color material while moving in the X-axis direction, and this step can be performed only once to obtain the final product. The effect is that the three-dimensional image with a thickness of about 1.1 to 1.5 mm or more is thick in some parts.

The entire process takes about 40-70 seconds, of which the image processing time is about 30-50 seconds, and the print execution time is 10-20 seconds (wherein including the debugging time and preparation time of the print).

The present invention has been described above in detail by combing the preferred embodiments; however, these embodiments are exemplary and only serve as illustrative. On the basis of the present invention, various replacements and improvements are permitted, and will be seen in the scope of the present invention.

What is claimed is:

1. A color 3D printer, comprising an image processing module and an execution device, wherein,
the image processing module comprises a processor,
the execution device comprises a workbench (4) and nozzle assemblies (3), wherein an object is printed on the workbench (4), the workbench (4) is capable of vertically moving in a Z-axis direction; the nozzle assemblies (3) are configured to print the object by spraying material on the workbench (4) or a previously formed sprayed layer of the material, the nozzle assemblies (3) are capable of moving along an X-axis direction;
wherein the nozzle assemblies (3) are mounted on an outer wall of a ring band (7); the ring hand (7) is disposed above the workbench (4);
wherein each of the nozzle assemblies (3) comprise at least three spray pipes (31) with respective nozzles (32);
wherein the respective nozzles (32) face against an outside of the ring band (7);
the nozzle assemblies (3) are capable of rotating around the workbench along the X-axis direction with the ring band (7);
wherein the ring band (7) is a ring belt.

2. The printer according to claim 1, characterized in that,
wherein the at least three spray pipes (31) of each of the nozzle assemblies (3) are arranged in parallel;
wherein the at least three spray pipes (31) of each of the nozzle assemblies (3) are independently connected with a feed constant pressure system (33);
wherein each of the nozzle assemblies (3) comprise a material curing device (36) arranged in parallel with the at least three spray pipes (31), respectively.

3. The printer according to claim 1, characterized in that, the respective nozzles (32) have diameters between nanometers to picometers and a respective voltage sensing switch (37) disposed on the respective nozzles (32), respectively;
wherein each of the respective voltage sensing switches (37) are connected to a respective control chip (34) by a respective wire (35), and each of the respective control chips (34) are collectively connected to the image processing module; each of the respective control chips (34) and each of the respective wires (35) are arranged in a respective spray pipe of the at least three spray pipe (31).

4. The printer according to claim 2, characterized in that, the material curing device (36) comprises at least one UV lamp.

5. The printer according to claim 1, characterized in that, the execution device further comprises a waste collection tank (1) and a liquid suction device (5).

6. The printer according to claim 1, characterized in that, wherein the at least three spray pipes (31) comprises at least five spray pipes.

7. The printer according to claim 1, wherein the at least three spray pipes (31) comprises at least four spray pipes.

8. The printer according to claim 4, wherein the at least one UV lamp comprises two UV lamps.

9. The printer according to claim 5, wherein the liquid suction device (5) comprises a suction connector (51) and a negative pressure machine (52); the suction connector (51) is in a shape of hood with one end open provided with a silicone gasket; the liquid suction device (5) is further provided with a scraper.

10. The printer according to claim 6, wherein the at least three spray pipes comprise at least eight spray pipes (31).

* * * * *